(12) United States Patent
Jaffe et al.

(10) Patent No.: US 8,393,201 B2
(45) Date of Patent: Mar. 12, 2013

(54) SENSING IGNITION BY VOLTAGE MONITORING

(75) Inventors: Norman Jaffe, Vancouver (CA); Jose Crisologo, Vancouver (CA)

(73) Assignee: Webtech Wireless Inc., Burnaby, British Columbia (CA)

( * ) Notice: Subject to any disclaimer, the term of this patent is extended or adjusted under 35 U.S.C. 154(b) by 11 days.

(21) Appl. No.: 12/886,799

(22) Filed: Sep. 21, 2010

(65) Prior Publication Data
US 2012/0067113 A1   Mar. 22, 2012

(51) Int. Cl.
*G01M 15/00* (2006.01)
(52) U.S. Cl. .................. 73/114.62; 73/114.58
(58) Field of Classification Search .......... 73/114.58, 73/114.62
See application file for complete search history.

(56) References Cited

U.S. PATENT DOCUMENTS

| | | | |
|---|---|---|---|
| 4,383,242 A | | 5/1983 | Sassover et al. |
| 5,309,379 A | * | 5/1994 | Rawlings et al. .......... 703/8 |
| 5,743,227 A | * | 4/1998 | Jacquet et al. ........ 123/179.3 |
| 5,852,789 A | * | 12/1998 | Trsar et al. ............ 701/102 |
| 6,281,682 B1 | | 8/2001 | Kameda et al. |
| 6,914,524 B2 | | 7/2005 | Berndorfer et al. |
| 7,342,382 B1 | * | 3/2008 | Blackburn et al. .......... 322/16 |
| 7,953,530 B1 | * | 5/2011 | Pederson et al. ........ 701/31.7 |
| 7,962,271 B1 | * | 6/2011 | Thompson et al. ........ 701/99 |
| 2002/0068999 A1 | * | 6/2002 | Kotre et al. ............ 701/22 |
| 2002/0072963 A1 | * | 6/2002 | Jonge ................ 705/13 |
| 2002/0107625 A1 | * | 8/2002 | Beck et al. ............ 701/50 |
| 2003/0060953 A1 | * | 3/2003 | Chen ................ 701/33 |
| 2003/0093192 A1 | * | 5/2003 | Chang ................ 701/2 |
| 2004/0138882 A1 | * | 7/2004 | Miyazawa ............ 704/233 |
| 2006/0253282 A1 | * | 11/2006 | Schmidt et al. ......... 704/233 |
| 2011/0248841 A1 | * | 10/2011 | Whitlock ............ 340/426.1 |

FOREIGN PATENT DOCUMENTS

| | | |
|---|---|---|
| EP | 1978490 | 10/2008 |
| WO | 20090133195 | 11/2009 |

OTHER PUBLICATIONS

Elan Europe, "Intelli-Switch Module", Marketing Collateral, Jul. 20, 2010.
Autoleads, "In-Line Phantom Ignition Source," Retrieved on Sep. 20, 2010 from: http://www.nexxia.co.uk/PDF_Files/06-SENSE.pdf.

* cited by examiner

*Primary Examiner* — Freddie Kirkland, III
(74) *Attorney, Agent, or Firm* — John R. Flanagan

(57) ABSTRACT

A method of sensing vehicle engine ignition status is disclosed wherein samples of only the electrical system voltage levels are used. Sampling voltages that drop sufficiently (in magnitude and quantity over a period of time) will signify an "engine off" state.

10 Claims, 4 Drawing Sheets

Electrical System Voltage

SENSING IGNITION BY VOLTAGE MONITORING

FIELD OF THE INVENTION

This invention relates to vehicle ignition sensing.

BACKGROUND OF THE INVENTION

Vehicle ignition sensing is conventionally obtained by sampling a variety of electro-mechanical phenomena related to the engine and ignition circuitry. Prior art attempts suffer from disadvantages, including installation difficulties (e.g. properly calibrated connections are required to the various electro-mechanical sensors related to the vehicle engine and performance attributes thereof) and quiescence characteristics of the electrical systems (e.g. the effective capacitance and inductance of many circuits differ in their timing characteristics and often resist rapid changes in voltage and thus are untimely sources of information and inference during the transition towards recognizing the "off" state of ignition).

SUMMARY OF THE INVENTION

The present invention addresses these disadvantages by simply sampling the voltage levels of the vehicle battery in an intelligent way.

A method is disclosed of sensing the ignition state of a vehicle engine, comprising the steps of: a) sampling the voltage level of the vehicle electrical system as powered by the vehicle battery without relying on other physical phenomena related to the engine, to obtain a current voltage sample; b) determining if said current voltage sample has a sufficient drop from the preceding voltage sample; c) determining if said current voltage sample is reliable; and d) determining if said current voltage is below a specified threshold from which an accurate inference is that the vehicle engine ignition is off.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

NOTICE REGARDING COPYRIGHTED MATERIAL. A portion of the disclosure of this patent document contains material which is subject to copyright protection. The copyright owner has no objection to the facsimile reproduction by anyone of the patent document or the patent disclosure as it appears in the Patent and Trademark Office file or records, but otherwise reserves all copyright rights whatsoever.

The ignition sensing of the present invention (in its basic method) relies only on (conventionally) sampling the vehicle electrical system as powered by the vehicle battery. The logic of the ignition sensing of the present invention can be carried out within a conventional software/hardware platform (e.g. a microprocessor with performance capability to execute a several hundred lines of C-language code) that is implemented in a standalone device or part of a pre-existing device (such as the telematics device, WT5000NG Locator commercialized by Webtech Wireless Inc.). Herein, the software/hardware implementation of the logic of the present invention will be considered to be housed in a Voltage Monitor having an appropriate hardware/software platform, regardless of the physical implementation.

FIGS. 1-4 (and explanatory text therein) show and explain idealized voltage behaviours during the ignition and de-ignition processes in various scenarios.

Figure 1:
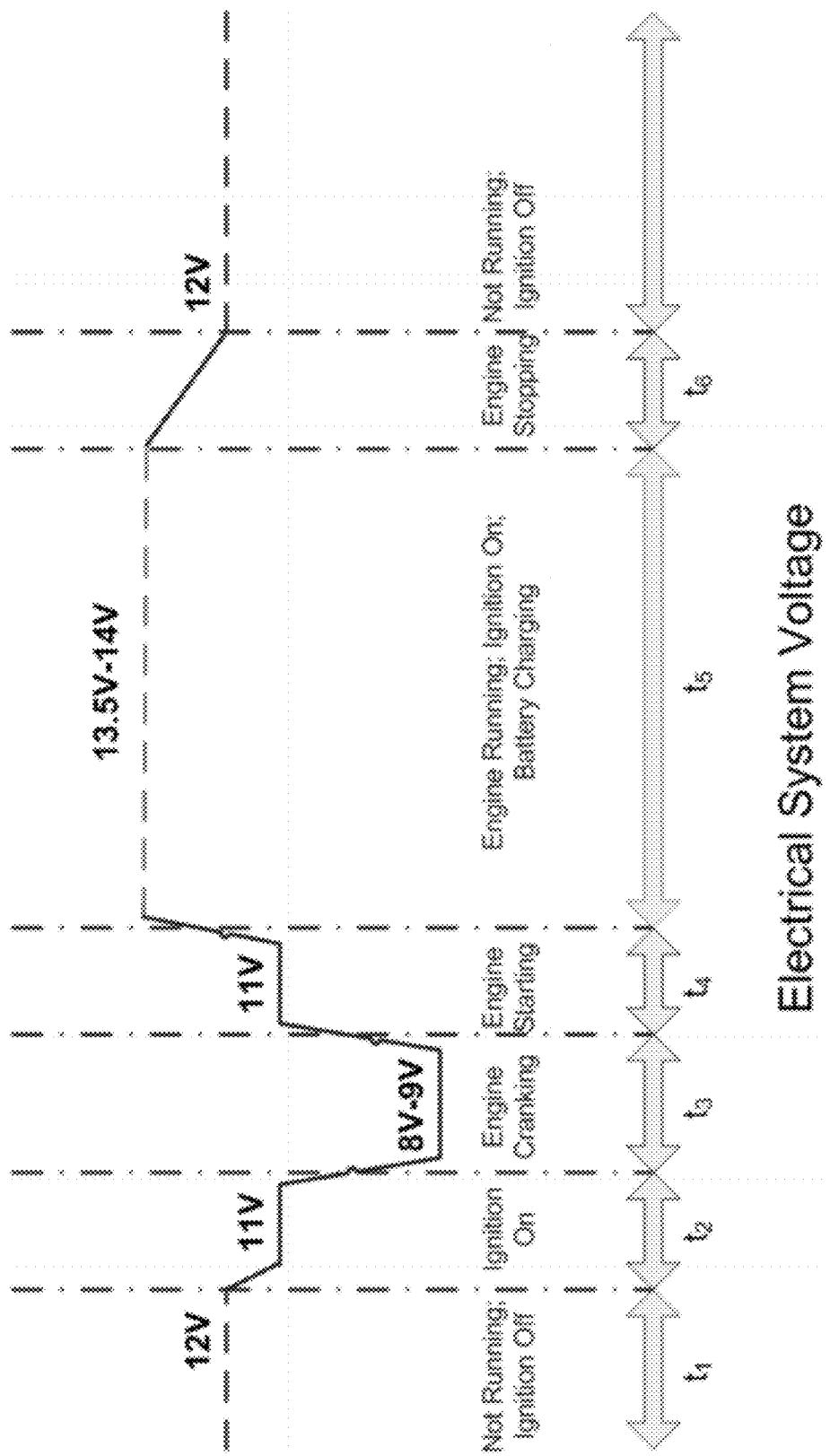
FIG. 1 shows the idealized voltage levels during a typical ignition and de-ignition scenario, of a vehicle voltage system.
Figure 2:
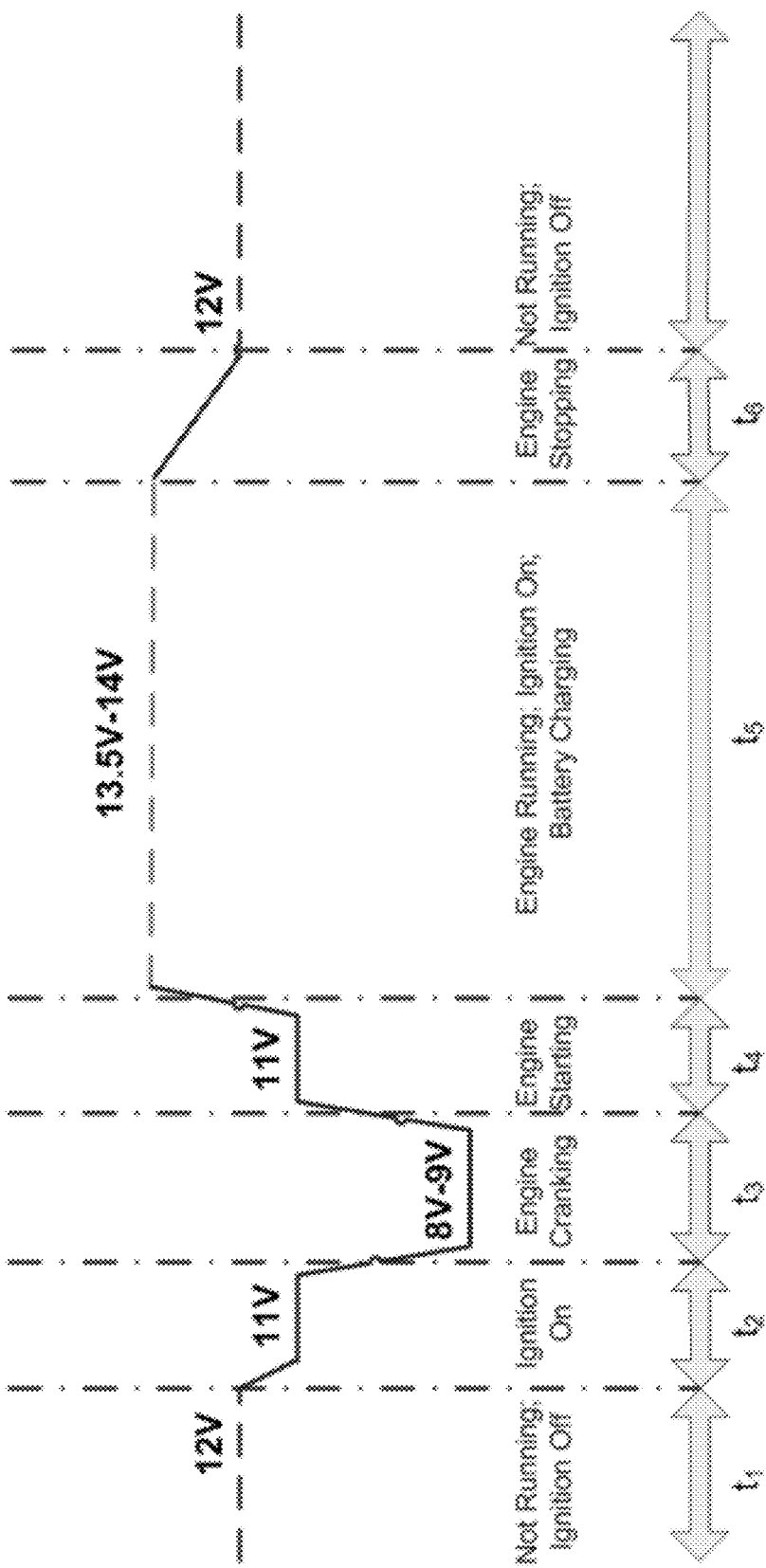
FIG. 2 shows the idealized voltage levels during a typical ignition and de-ignition scenario, in the case where the Voltage Monitor of the present invention has a constant vehicle battery connection.
Figure 3:
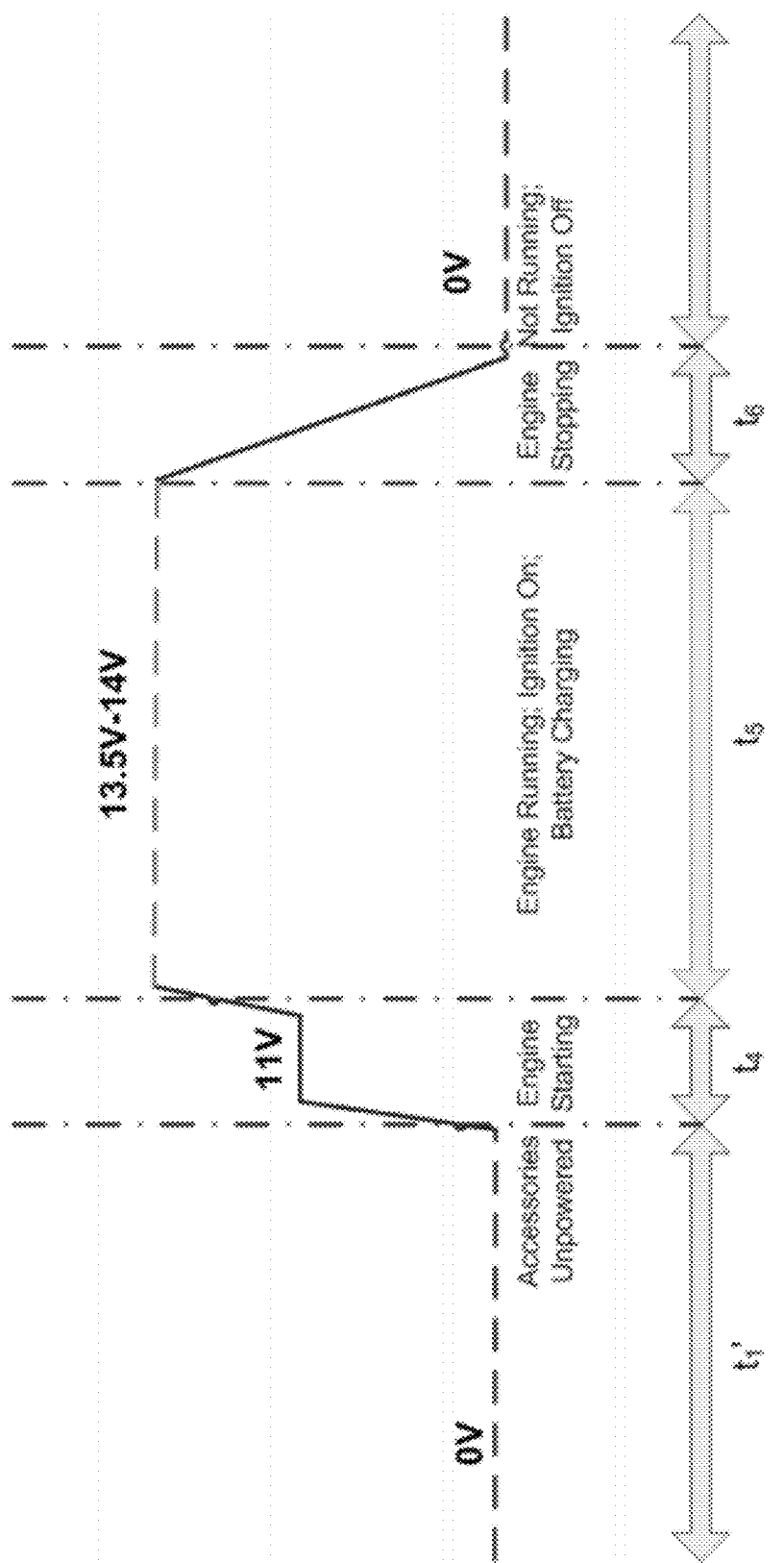
FIG. 3 shows the idealized voltage levels during a typical ignition and de-ignition scenario, in the case where the Voltage Monitor of the present invention has an internal battery.

The voltage level behaviour follows the repeatable pattern shown in FIG. 1 and is governed by the physics of the ignition system, vehicle battery and alternator. The initial voltage is the "resting voltage" of the vehicle battery and will drift with time as the battery ages. The interval $t_1$ can be arbitrarily long. When the ignition switch is turned on, there is a brief interval $t_2$ when the vehicle battery is providing current to the starter and accessories but the starter has not yet engaged. The $t_2$ interval depends on how long the vehicle operator keeps the ignition switch in the "accessories" position and how the vehicle electrical system has been configured. Once the starter has engaged, there is a further voltage drop as the starter motor draws current. This duration $t_3$ is relatively short because the alternator will begin to provide power once the vehicle engine starts cranking. While the starter is engaged, the vehicle battery and the alternator provide current to the starter during interval $t_4$. Once the engine is running, the starter no longer draws power and the battery begins charging—this corresponds to a higher-than-normal voltage in the electrical system and persists as long as the engine is running. This interval is $t_5$. When the engine is turned off, the electrical system returns to its "resting voltage". The interval of this return, $t_6$, can be appreciable, depending on the characteristics of the electrical system, and is often the source of slow detection because of retarding capacitance and inductance characteristics.

Figure 4:
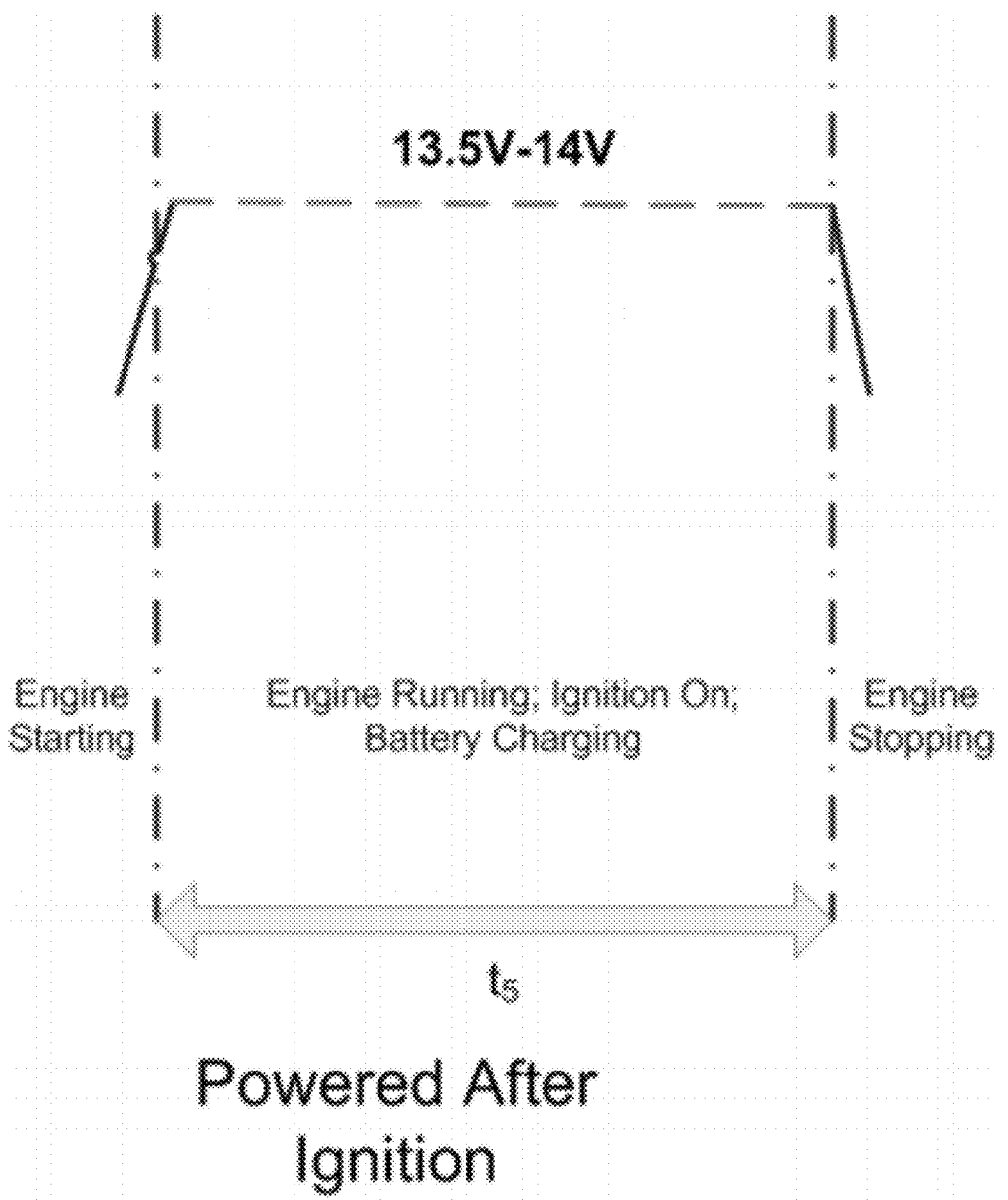
FIG. 4 shows the idealized voltage levels during a typical ignition and de-ignition scenario, in the case when the Voltage Monitor of the present invention is powered after engine ignition.

The Constant Battery Connection scenario (of FIG. 2) is for the configuration where power from the vehicle battery is always available (e.g. the Voltage Monitor is wired to the vehicle battery or the accessory port (e.g. cigarette lighter) does not lose power when the engine is not running (i.e. in Ignition Off state)). As expected, this scenario presents the same voltage behaviour of the FIG. 1 scenario. The Internal Battery scenario (of FIG. 3) is for the configuration where the Voltage Monitor has its own internal battery and is therefore always powered. The measured voltage is the "accessory" line voltage and only reflects the electrical system voltage when the accessory line is enabled. Interval $t_1$ is arbitrarily long and the engine starting interval $t_4$ may not be detectable. The engine stopping interval $t_6$ is nearly instantaneous, as power is removed from the accessories—the measured voltage is not the electrical system voltage but the "accessory" line voltage. FIG. 4 shows the scenario where accessories only have power after engine ignition. The measured voltage is the "accessory" line and only reflects the electrical system voltage when the accessories are enabled. The Voltage Monitor has power only when the accessories have power.

The ignition sensing of the present invention uses a plurality of parameters—Sample Interval, Sample Count, Transition Count On, Transition Count Off, On Threshold Voltage, Drop Delta and Off Threshold Voltage. The meanings of these seven parameters and their (examples only) default values are as follows.

"Sample Interval" is the time between voltage measurements taken at the vehicle battery or line therefrom. The default is 3 seconds.

"Sample Count" is the number of samples considered to calculate the Running Average Voltage. The default is 10.

"Transition Count On" is the number of consecutive voltage samples>=On Threshold Voltage that must appear to recognize the Ignition On state. The default is 5.

"Drop Delta" is the minimum difference between the current voltage sample and the Running Average Voltage and is used in the calculation that recognizes the Ignition Off state. The default is 1V.

"Transition Count Off" is the number of consecutive {voltage samples<(Running Average Voltage−Drop Delta)} that must appear to recognize the Ignition Off state. The default is 5.

"On Threshold Voltage" is the minimum voltage that is recognized as the Ignition On state. The default is 13.1V.

"Off Threshold Voltage" is the maximum voltage that will be recognized as the Ignition Off state. The default is 13.1V.

A running value, "Running Average Voltage" is calculated based sampled voltages according to the parameters Sample Count and Sample Interval, and is explained more below.

The basic method of the present invention is as follows.

1. Initialize by setting (a) above-described default values to their respective parameters, and (b) state as Ignition Off.

2. Start and continue (a) to sample voltage according to the Sample Interval, (b) to update the Running Average Voltage and (c) to count voltage samples (against matching Transition Count On parameter and then matching Transition Count Off parameter) until Ignition Off state is recognized (step/event #4 described below) after Ignition On state is earlier recognized (step/event #3 described below).

3. When Transition Count On samples have been seen, recognize the state as Ignition On.

4. When Transition Count Off samples are seen or {Running Average Voltage<Off Threshold Voltage}, recognize the Ignition Off state.

In other words, after initialization, and while the sequential recognitions of Ignition On and Ignition Off have not occurred, continue to sample voltage and count the Transition Count On and Transition Count Off parameters.

The basic method can be advantageously tuned, as follows. The seven parameters are described above as having fixed values. But these parameters can be made more useful by tuning them as part of the (initial) Voltage Monitor installation process or by having them dynamically responsive to local and changing (post-installation) conditions (of or around the vehicle battery) or as the result of both installation and post-installation processes. The tuning can be advantageously accomplished by a user/installer assisted by a software version implementing (or assisting the decision-making process based on) one or more of the following heuristics and guidelines.

If the Ignition On state is not being reached, reduce the On Threshold Voltage. The default value of 13.1 volts was found to work in many vehicle/battery combinations, as it is higher than the resting voltage of many vehicle batteries and below the $t_5$ "engine running" interval voltage level (of FIGS. 1-4) which corresponds to the status of Ignition On (i.e. the engine is on and the vehicle battery is recharging). But, depending on the actual vehicle battery (which may be very weak), the default value of On Threshold Voltage may be too high and so, that parameter should be reduced.

If the Ignition On state is quickly followed by the Ignition Off state, this may be due to an Off Threshold Voltage that is too high: reduce the Off Threshold Voltage.

If the Ignition Off state is not being seen before the Off Threshold Voltage is reached, it is possible that the Sample Count is too low, resulting in the Running Average Voltage dropping too quickly. Accordingly, increase the Sample Count and/or the Transition Count Off.

If the transitions are taking too long but are being reliably seen, try reducing the Transition Count On and/or the Transition Count Off. However, it should not be reduced too much (e.g. not below three), to avoid 'porpoising' (i.e. rapid fluctuations due to "noise" instead of something from which to make a reasonable inference) and perhaps should not be much more than half of the Sample Count, to avoid missing transitions altogether.

If the Voltage Monitor has neither an internal battery (or has one that has insufficient charge) nor a constant battery connection, then Transition Count On can be reduced to a minimum value as it will only affect the Ignition On state detection.

The variable, the Running Average Voltage, is generally calculated simply as the arithmetic average of {the current voltage sample and the preceding (Sample Count−1) voltage samples}.

But anomalous situations do occur during the ignition-electrical dynamics in a vehicle (especially in what might be—or not—transitioning as the result of the ignition being turned off) and these anomalous situations are addressed appropriately (so as not to create false inferences of the true ignition state). For example, where a single severe voltage drop is seen in otherwise high voltage level behaviour (or more generally, an insufficient number of low voltage values are sampled recently), the Running Average Voltage is modified with a value that reflects more reliable voltage samples.

The notions of "anomalous situations" and "reliability" can be implemented as follows. For example, consider Running Average Voltage(i) to be calculated as the result of voltage sample v(i), where v(i)<v(i−1)<v(i−2). If the difference between consecutive voltage samples v(i−1) and v(i) is >=(2× Drop Delta), then let Running Average Voltage(i) be the average of the immediately preceding two voltage samples, v(i−1) and v(i−2); or simply the immediately preceding voltage sample, v(i−1); or use the preceding/incumbent Running Average Voltage(i−1), i.e. set Running Average Voltage (i)=Running Average Voltage(i−1). Stated generally, an anomalous voltage sample is one that is very inconsistent with the trend of preceding voltage samples; and a reliable voltage sample is one that is consistent with the trend of preceding voltage samples, where the metric of (in)consistency is the amount of arithmetic deviations in recent sampling history; and in case of an anomalous sample, a more reliable voltage value is used to continue the process of updating the Running Average Voltage.

The parameter of Transition Count Off was described above as being interested in (default five) consecutive samples of the specified characteristic (of being <(Running Average Voltage−Drop Delta)). The requirement of consecutivity can be relaxed somewhat so that, for example, only a given subset of consecutive sample voltages need have the specified characteristic (e.g. four of the last five voltage samples have the specified characteristic). This has an effect similar (but not identical) to reducing the Transition Count Off. Also, Transition Count On and Transition Count Off can advantageously have different values as part of the tuning process.

Although the last step of the basic method advantageously describes the condition of {Running Average Voltage is <Off Threshold Voltage} as one to trigger the recognition of the state of Ignition On, that trigger is strictly speaking, not necessary where the characteristics of the vehicle battery, in particular, and the electrical system, generally, behave so that the value of Running Average Voltage and the Transition Count Off, Delta Drop and other parameters are appropriate to recognize the drops in voltage samples as part of a de-ignition transition.

Although the Drop Delta parameter has been described above as having a fixed value, it can also be implemented as a (variable) function that is sensitive to (perhaps changing) local conditions to provide better intelligence as part of a more robust inference of ignition status. For example, if the downward slope of voltage sampling is increasing (i.e. becoming steeper) then the sampled voltage is dropping more rapidly. This means that the Ignition Off state would be reached more quickly, and the Running Average Voltage might drop too rapidly. In that case, it might make sense to increase the Sample Count to avoid missing the drop. Alternatively, the Drop Delta could be reduced. However, overly reducing the Drop Delta may result in false on-to-off transitions (i.e. may create over-reactions to voltage drops). If the Sample Count and the Sample Interval are small then the Running Average Voltage will shift rapidly, often more quickly than can trigger via the Drop Delta, and so consider increasing the Sample Count and the Sample Interval.

For another example, the Drop Delta can consider local conditions such as vehicle battery age, engine-on time and air temperature with a linear, non-linear or fuzzy logic relationship that appropriately increases (or decreases) the Drop Delta. Some of these conditions are easily available as being provided by standard vehicle diagnostics (e.g. OBDII). Some require input from the user to calculate the approximate age of the vehicle battery. For example, with local condition inputs $x_0$=vehicle battery age, $x_1$=engine-on time, $x_2$=ambient temperature, $x_3$=measured voltage (=v(i), above), $x_4$=engine temperature, $x_5$=current Drop Delta; and output of $y_0$=new Drop Delta with the activation function $\phi_0(\ )$, internal activity $IA_0$, threshold $\theta_0(\ )$ and summing function $\Sigma_0(\ )$ we determine the synaptic weights $\{w_0, w_1, w_2, w_3, w_4, w_5\}$ via a standard neural network learning algorithm. Accordingly, the resulting expressions are resolved: $IA_0(\ )=\Sigma_0(w_0*x_0, w_1*x_1, w_2*x_2, w_3*x_3, w_4*x_4, w_5*x_5)$ and $y_0=\phi_0(IA_0, \theta_0(\ ))$. The activation function $\phi_0(\ )$ maps between the summed values of the local conditions $(x_0, x_1, \ldots)$ and the new Drop Delta. The threshold function $\theta_0(\ )$ can provide either a fixed threshold or a time-varying relationship that does not depend on the local conditions.

While exemplary embodiments of the present invention have been shown and described by way of example only, numerous variations, changes and substitutions will occur to those of skill in the art without departing from the invention herein. In particular, although default values and other examples are described above, they are intended in a non-limiting way. Responsive to changes in vehicle engine/ignition/battery technologies, the appropriate values (default and eventually tuned) for the above-described parameters and formulas, are easily determined by those of skill in the art. Accordingly, it is intended that the invention be limited only by the spirit and scope of the appended claims.

We claim:

1. A method of sensing the ignition state of a vehicle engine, comprising the steps of:
    a) sampling a voltage level of a vehicle electrical system as powered by a vehicle battery without relying on other physical phenomena related to the engine, to obtain a current voltage sample;
    b) determining if said current voltage sample has a sufficient drop from a preceding voltage sample;
    c) determining if said current voltage sample is reliable by determining if a trend of voltage samples preceding said current voltage sample is consistent with said current voltage sample; and
    d) determining if said current voltage sample is below a specified threshold from which an accurate inference is that the vehicle engine ignition is off.

2. A method of sensing the ignition state of a vehicle engine, comprising the steps of:
    a) sampling a voltage level of a vehicle electrical system as powered by a vehicle battery without relying on other physical phenomena related to the engine, to obtain a current voltage sample;
    b) determining if said current voltage sample has a sufficient drop from a preceding voltage sample;
    c) determining if said current voltage sample is reliable;
    d) determining if said current voltage sample is below a specified threshold from which an accurate inference is that the vehicle engine ignition is off; and
    e) calculating a Running Average Voltage;
    wherein step b) determines if said current voltage sample has a sufficient drop from said preceding voltage sample by measuring whether the drop exceeds a prescribed Drop Delta below said Running Average Voltage.

3. The method of claim 2, wherein step b) determines if said current voltage sample has a sufficient drop by further measuring whether there is a prescribed number of consecutive voltage samples each having a drop exceeding said Drop Delta.

4. The method of claim 3, further comprising the step of determining whether the Running Average Voltage is below a prescribed voltage, and if it is, recognizing an Ignition Off state.

5. The method of claim 2, wherein if it is determined that said current voltage sample is not reliable, further comprising the step of substituting said Running Average Voltage with a value of a preceding Running Average Voltage.

6. The method of claim 2, wherein said Drop Delta is a function of local conditions being a weighted sum of vehicle battery age, engine-on time, ambient temperature, current voltage sample, engine temperature, and current Drop Delta, where respective synaptic weights are learned via a standard neural network learning algorithm.

7. The method of claim 2, wherein said Drop Delta is a fuzzy logic function based on local conditions of vehicle battery age, engine-on time, ambient temperature, current voltage sample, engine temperature, and current Drop Delta.

8. A method of sensing the ignition state of a vehicle engine, comprising the steps of:
    a) sampling a voltage level of a vehicle electrical system as powered by a vehicle battery without relying on other physical phenomena related to the engine, to obtain a current voltage sample;
    b) determining if said current voltage sample has a sufficient drop from a preceding voltage sample;
    c) determining if said current voltage sample is reliable;

d) determining if said current voltage sample is below a specified threshold from which an accurate inference is that the vehicle engine ignition is off; and e) assigning default values to a plurality of parameters comprising Sample Interval, Sample Count, Transition Count On, Transition Count Off, On Threshold Voltage, Drop Delta and Off Threshold Voltage, and then tuning the parameters using guidelines and heuristics.

9. The method of claim 8, wherein the parameter of Transition Count Off is assigned a value that differs from a value of Transition Count On.

10. The method of claim 8, wherein the parameter of Transition Count Off is changed in response to a recent trend of voltage samples.

* * * * *